United States Patent Office 3,606,447
Patented Sept. 20, 1971

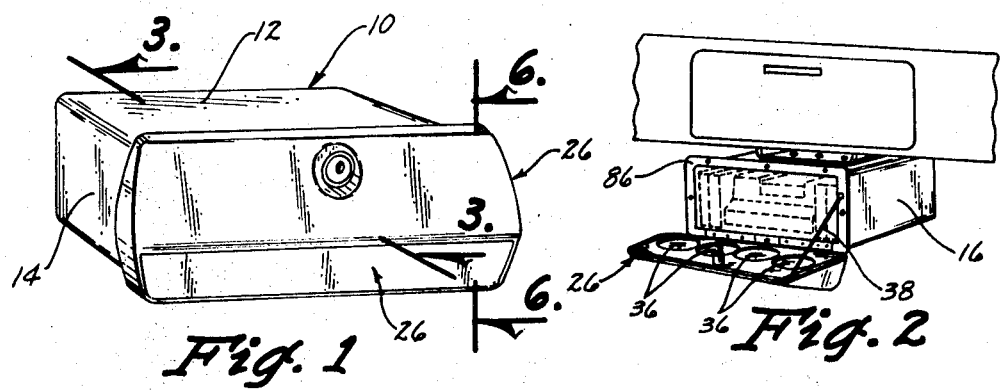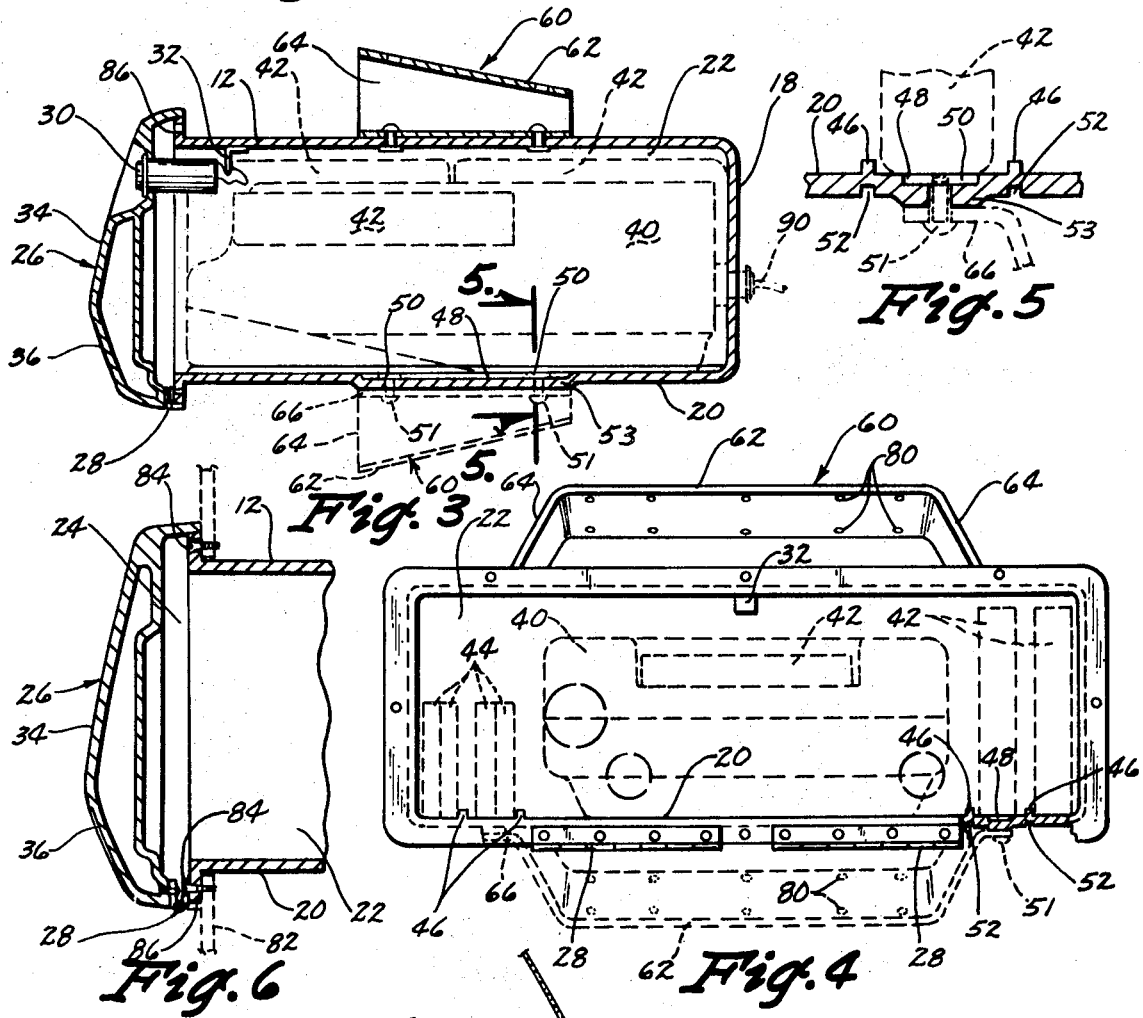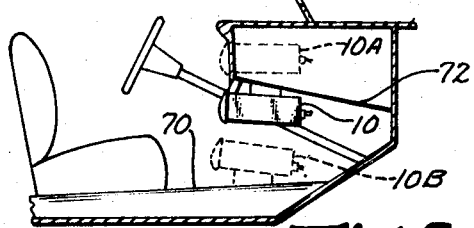

3,606,447
VEHICLE STEREO TAPE AND GLOVE COMPARTMENT
Ronald A. Ryding, Woodland Hills, Calif.
(2831 Topaz Drive, Apt. C, Riverside, Calif. 92507)
Filed June 30, 1969, Ser. No. 837,436
Int. Cl. B60r 7/00
U.S. Cl. 296—37                                              4 Claims

ABSTRACT OF THE DISCLOSURE

An enclosure for tape players and tape cartridges having a reversible mounting bracket permitting the compartment to be mounted under the dashboard of the vehicle or on the tunnel over the power drive shaft. The mounting bracket provides a theft proof installation. The interior of the compartment is provided with upstanding cartridge guide shoulders for maintaining the tape cartridges in a stored condition on opposite sides of the tape player. Appropriately shaped depressions are formed in the inner surface of the compartment door for holding refreshment containers or the like.

---

A common accessory being added to automobiles, boats and other vehicles is the stereo tape player. One of the biggest problems however has been that they are very easy to remove from the vehicle and thus there has been a high theft rate of the expensive tape players from automobiles and the like.

This invention provides a compartment for the tape player and tapes that is substantially theft proof and may be used for protecting other valuable items from theft in a vehicle. By enclosing the expensive tape player in the compartment of this invention the tape player is disguised and its presence in the vehicle is not apparent from the outside. The fasteners and fastening bracket used may be worked upon only from the inside of the compartment and thus if the compartment door is locked it is not possible for the compartment to be removed from the vehicle.

The compartment may be mounted directly in the dash flush therewith or directly thereunder using a mounting bracket which may be inverted for mounting the compartment on the car drive shaft tunnel. The floor of the typical automobile and the under side of the dash both taper towards each other such that the mounting bracket having a tapering thickness complements the angle of the dash or the floor to position the compartment and the tape player in a substantially horizontal position.

The interior of the compartment is provided with longitudinally extending upstanding shoulders which function to guide and separate tape cartridges or cassettes from each other and from the tape player positioned in the center of the compartment. The cartridges and cassettes are stored in side by side relationship and are stacked end to end on the bottom wall of the compartment on the opposite sides of the tape player. The upstanding tape guide shoulders are spaced at a distance apart which will permit either two cassettes to be placed between each pair of shoulders or one cartridge.

An elongated depression is formed in the interior surface of the bottom wall of the compartment to receive the lock nuts on fastening bolts extending through the end flanges of the mounting bracket which engages a downwardly extending shoulder having a mere image of the elongated depression.

These and other features and advantages of this invention will become readily apparent to those skilled in the art upon reference to the following description when taken into consideration with the accompanying drawings, wherein:

FIG. 1 is a front perspective view of the compartment unit;
FIG. 2 is a fragmentary perspective view of the compartment unit mounted under the dash of a vehicle;
FIG. 3 is a cross-sectional view taken along line 3—3 in FIG. 1;
FIG. 4 is a fragmentary front elevation view of the unit;
FIG. 5 is a fragmentary cross-sectional view taken along line 5—5 in FIG. 3;
FIG. 6 is a cross-sectional view taken along line 6—6 in FIG. 1; and
FIG. 7 is a cross-sectional view of a vehicle showing the three different mounting positions in which the tape player compartment unit may be mounted in a vehicle.

The tape player and glove compartment unit of this invention is generally referred to in FIG. 1 by the reference numeral 10 and includes top wall 12, opposite side walls 14 and 16, rear end wall 18 and a bottom wall 20 cooperating together to define a chamber 22. An access opening 24 into the chamber 22 is provided which may be closed by a door 26 hinged at 28 to the bottom wall 20.

A key operated lock 30 is mounted in the door 26 and releasably engages a latch 32 mounted on the under side of the top wall 12 of the compartment 10. The door 26 includes outwardly converging surfaces 34 and 36 which give the door a streamlined appearance. The surface 36 includes an inlaid panel of decorative material such as stained walnut. The inner side of the door 26 includes a series of depressions 36 to receive drinking containers or the like when the door is in its opened position as seen in FIG. 2. A cable 38 extending between the door 26 and the side wall 16 limits the opening of the door to a horizontal position.

As seen in FIG. 4, the size of the chamber 22 is sufficient to accommodate a stereo player 40 in the center thereof with stereo cartridges 42 stored on one side and stereo cassettes 44 stored on the opposite side. Upstanding shoulders 46 are provided on each side of the bottom wall 20 and are spaced apart sufficiently to conveniently store tape cartridges or cassettes 42 and 44 respectively. When cassettes are being stored as shown in FIG. 4 two may be placed between each of the shoulders 46. Further, as seen in FIG. 3, the compartment 10 is long enough to accommodate in an end to end relationship two of the larger cartridges 42.

An elongated depression 48 is formed in the inner side of the bottom wall 20 between each of the upstanding shoulders 46 and receives a locking nut 50 engaging fastening bolts 51 extending through a downwardly projecting elongated shoulder 53 having a mirror image of the elongated recess 48. Similarly, depressions 52 are formed in the bottom side of the bottom wall 20 having a mirror image of the tape guide shoulders 46 as seen in FIG. 5.

The compartment 10 is mounted in either of the three positions shown in FIG. 7 and referred to by the reference numerals 10, 10A, and 10B. A mounting bracket 60 is provided which is reversible and may be used for mounting the unit 10 in either of the positions shown at 10 or 10B in FIG. 7. It is seen in FIGS. 3 and 4 that the mounting bracket 60 is generally channel-shaped having a base portion 62 with outwardly flaring leg portions 64 terminating in mounting flanges 66. As viewed in the drawings, the legs 64 have a reduced length from the front to the rear forming an angle for the plane of the base portion 62 which complements the angle of the vehicle floorboard 70 (tunnel over a car drive shaft) and the bottom side 72 of a dash board such that the stereo compartment is positioned in a substantially level condition or as seen in FIG. 7 the front end of the compartment 10 extends slightly higher than the back end which facilitates use of the compartment and the tape player and tapes contained inside.

It is noted that the ends of the mounting flanges 66 as seen in FIG. 5 terminate at the side edge of the downwardly extending shoulders 53 such that a pry instrument cannot be inserted therebetween in an effort to break the connection formed by the fastening bolts 51 and the lock nuts 50. The fastening bolts 51 have a rounded head which cannot be operated from the outside. The tightening and untightening operation is performed from within the chamber 22 only after the door 26 has been unlocked.

When the mounting bracket is secured to the vehicle the base portion 62 having a plurality of holes 80 formed therein is screwed first to the under side of the dash 72 or the floor 70 and then the flanges 66 are bolted to the bottom wall 20 of the compartment from within the chamber 22 of the compartment. The space between the bottom wall 20 and the base portion 62 is insufficient for any convenient operation of any fastening bolts or screws used to fasten the base portion 62 to the vehicle. Furthermore, the fastening bracket is located rearwardly from the forward end of the compartment and thus makes the fasteners used on the base portion 62 that much more inaccessible when the compartment 10 is installed.

In FIG. 6 it is seen that the compartment 10A is mounted flush in the dash board 82 and that screws 84 are employed for securing it to the dash board 82. The screws 84 extend through a peripheral flange 86 into the dash board 82 and are covered by the door 26 when the door is in its closed position of FIG. 6. Thus the compartment cannot be removed until the compartment door 26 is opened and this can only be accomplished through operation of the lock 30 by a key.

It is understood that the chamber 22 of the compartment 10 may be used to store other valuables in a car but most commonly will be used for the tape player unit 40 and the tape cartridges 42 and cassettes 44. The reversible and universal mounting bracket 60 is theft proof in its design and use whether the compartment be mounted directly under the dash or on the floor tunnel as seen in FIG. 7. The guide shoulders for the tape cartridges and cassettes make it possible to store a maximum number of tape cartridges and cassettes in the chamber 22 for convenient use in the tape player 40.

It is seen that the electrical wiring 90 extends through the rear wall 18 of the compartment and is connected into the tape player 40. The wiring is then connected in a conventional manner to the electrical and speaker system of the vehicle. The compartment may be formed of any suitable material such as high impact polyethylene and preferably will have a size of 15 inches wide, 12 inches deep, 5¼ inches high which will accommodate up to eight tape cartridges and still receive all tape players now available.

Some changes may be made in the construction and arrangement of my vehicle stereo tape and glove compartment without departing from the real spirit and purpose of my invention, and it is my intention to cover by my claims, any modified forms of structure or use of mechanical equivalents which may be reasonably included within their scope.

I claim:
1. A vehicle stereo tape compartment, comprising,
a housing having a chamber defined by top, bottom, opposite side walls, and a rear end wall,
said housing having a front access opening into said chamber closable by a door pivotally connected to said housing,
support means for securing said housing to a vehicle,
a pair of parallel spaced apart shoulders extending the substantial length of said bottom wall on each of the opposite sides of said chamber whereby tape cartridges may be positioned between said shoulders in each pair of shoulders and a space between the two pairs of shoulders is provided for a tape player unit.

2. A vehicle stereo tape compartment, comprising,
a housing having a chamber defined by top, bottom, opposite side walls, and a rear end wall,
said housing having a front access opening into said chamber closable by a door pivotally connected to said housing,
support means for securing said housing to a vehicle, said support means engaging a wall of said compartment and including a channel shaped bracket having a base portion and opposite side leg portions decreasing in length from the front to the back of said base portion, such that said base portion extends forwardly and away from said compartment wall, said leg portions including flange portions matingly engaging said wall of said compartment and said base portion being adapted to engage on its exterior a support member in a vehicle such that said compartment is positioned substantially level.

3. The structure of claim 2 wherein said wall is said bottom wall which includes elongated depressed portions on opposite sides adjacent said side walls forming downwardly extending mirror image shoulders on the bottom sides thereof, said flanges engaging said shoulders and bolt means extending through said flanges and said shoulders and having head means received in said elongated depressions.

4. The structure of claim 3 wherein said bottom wall includes a pair of upwardly extending tape cartridge guide shoulders on the inside thereof on opposite sides of each of said elongated depressed portions.

References Cited
UNITED STATES PATENTS

| | | | |
|---|---|---|---|
| 2,412,464 | 12/1946 | Mayer | 206—19.5A |
| 2,925,914 | 2/1960 | Bobko | 211—40 |
| 3,019,954 | 2/1962 | Faltin | 206—19.5A |
| 3,232,661 | 2/1966 | Walsh | 296—37 |
| 3,371,976 | 3/1968 | Ritz | 312—245 |
| 3,385,643 | 5/1968 | Adell | 206—1 |
| 3,428,357 | 2/1969 | Lueck | 206—19.5A |

PHILIP GOODMAN, Primary Examiner

U.S. Cl. X.R.

206—19.5; 312—245